(12) United States Patent
Czachor

(10) Patent No.: US 6,435,816 B1
(45) Date of Patent: Aug. 20, 2002

(54) GAS INJECTOR SYSTEM AND ITS FABRICATION

(75) Inventor: Robert Paul Czachor, Cincinnati, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/706,402

(22) Filed: Nov. 3, 2000

(51) Int. Cl.[7] ............................................. F04D 31/00
(52) U.S. Cl. ...................... 415/116; 415/180; 415/175
(58) Field of Search ............................... 415/116, 117, 415/175, 180, 176, 115; 416/95; 239/589, 548, 553, 565; 60/39.75; 29/889.5, 889.722, 889.721, 889.09, 890.1

(56) References Cited

U.S. PATENT DOCUMENTS

| | | | | |
|---|---|---|---|---|
| 3,217,655 A | * | 11/1965 | Sercy et al. | 415/116 |
| 3,462,071 A | * | 8/1969 | Garve | 415/116 |
| 4,296,599 A | * | 10/1981 | Adamson | 60/39.23 |
| 5,001,895 A | * | 3/1991 | Shekleton et al. | 60/39.36 |
| 5,198,179 A | * | 3/1993 | Bates | 266/217 |
| 5,261,224 A | * | 11/1993 | Shekleton et al. | 60/39.36 |
| 5,352,087 A | * | 10/1994 | Antonellis | 415/115 |
| 5,697,209 A | * | 12/1997 | Wettstein | 60/39.53 |
| 5,988,531 A | * | 11/1999 | Maden et al. | 239/406 |
| 6,224,329 B1 | * | 5/2001 | North | 415/116 |
| 6,234,746 B1 | * | 5/2001 | Schroder et al. | 415/115 |

* cited by examiner

Primary Examiner—F. Daniel Lopez
Assistant Examiner—Richard Edgar
(74) Attorney, Agent, or Firm—David L. Narciso

(57) ABSTRACT

A gas injector system includes a plenum with a plenum opening in the wall of the plenum. An injector is positioned at a location overlying the plenum opening. The injector includes a injector block affixed to the exterior surface of the plenum wall, a joint between the injector block and the plenum wall, and an angularly inclined injector passage extending through the injector block from an injector passage inlet to an injector passage outlet. The injector block is preferably brazed to the plenum wall for high-temperature applications, or adhesively joined for low-temperature applications.

21 Claims, 3 Drawing Sheets

GAS INJECTOR SYSTEM AND ITS FABRICATION

This invention relates to the angled injection of a gas such as cooling air and, more particularly, to an injection apparatus and its fabrication.

BACKGROUND OF THE INVENTION

It is sometimes necessary to inject a gas from a thin-walled gas plenum, through a relatively long passage, and at an inclined injection angle into a space. As an example, in the tubomachinery of a gas turbine engine, cooling air is injected at an inclined angle from an annular plenum into the cavity between the plenum and a rotating shaft. The cooling air must be injected at an angle to the axial direction to avoid turbulence that would lead to local hot spots, and the air must flow down a tube to ensure that it is flowing in a stable manner in the intended direction.

A simple hole or orifice in the wall of the plenum does not produce the desired inclined flow direction and flow uniformity. A fitting with a hole therein may be welded into the wall of the plenum, but the welding of the fitting is expensive and time-consuming.

In another approach to the injection problem, the wall of the plenum is made sufficiently thick, and inclined passages are drilled at the required locations and angles. This solution is operable but requires the use of a thick-walled plenum that adds unnecessary weight to the structure. In yet another approach, a ring having the necessary passages drilled therein is welded into the wall of the plenum to form part of the wall. This approach is operable but costly to implement because of the required welding and also adds unnecessary weight. Changing the sizes and orientations of the passages is difficult, and requires that the ring be replaced.

None of the existing solutions to the gas injection problem has proved fully satisfactory. There is a need for an improved approach to the injection of gas from a plenum. The present invention fulfills this need, and further provides related advantages.

BRIEF SUMMARY OF THE INVENTION

This invention provides a gas injector system and a method for its fabrication. The gas injector system works with gas supplied through a plenum, such as a thin-walled plenum. The gas injector provides an elongated gas flow passage with an inclined injection angle. A wide variety of shapes, sizes, and arrangements of gas flow passages may be utilized and fabricated. The gas injector is fabricated separately from the plenum and then affixed to the plenum. It may also be detached from the plenum and replaced if necessary.

A gas injector system comprises a plenum having a plenum wall with an exterior surface, a local tangential direction parallel to the exterior surface, and a local normal direction perpendicular to the exterior surface. The plenum may be of any thickness, but typically is relatively thin sheet metal. There is a plenum opening in the plenum wall. An injector is positioned at a location overlying the plenum opening. The injector comprises an injector block affixed to the plenum wall, a joint between the injector block and the plenum wall, and an injector passage extending through the injector block from an injector passage inlet to an injector passage outlet. The injector passage outlet is oriented at an injection angle of more than 0 degrees away from the local normal direction and toward the local tangential direction. The injector passage inlet is in registry with the plenum opening. In a typical embodiment, the plenum has a plurality of openings in the plenum wall and a respective injector for each of the openings.

In one form, the injector passage is substantially straight and of constant diameter. In other forms, however, the injector passage may be curved and/or of a non-constant diameter, non-circular cross section, or in the form of a nozzle. There may be one or more than one injector passage in the injector block. The injection angle of gas leaving the injector passage(s) may be at any operable orientation, but typically is from about 50 degrees to about 70 degrees from the local normal direction. The joint is preferably a brazed joint for high-temperature applications, or an adhesive joint for low-temperature applications, both of which are more convenient and less expensive than the welding used in conventional approaches.

In an application of particular interest to the inventor, the injector system injects gas into the cavity between a gas plenum and a rotating turbomachinery shaft, so that the gas is injected toward the direction of rotation. In this embodiment, a gas injector system comprises an annular plenum having an annular centerline, a plenum wall with an exterior surface, a local circumferential tangential direction parallel to the exterior surface, and a local normal direction perpendicular to the exterior surface. A plurality of plenum openings are formed in the wall of the annular plenum, the plenum openings being spaced along a circumferential band of the annular plenum. The circumferential band of the annular plenum typically faces inwardly toward the annular centerline. The injector system includes a plurality of injectors, each injector being positioned at a location overlying one of the plenum openings. Each injector comprises an injector block affixed to the plenum wall, a joint between the injector block and the plenum wall, and an injector passage extending through the injector block from an injector passage inlet to an injector passage outlet. The injector passage outlet is oriented at an injection angle of more than 0 degrees away from the local normal direction and toward the local circumferential tangential direction.

The gas injector system is prepared by fabricating an injector block having an injector passage therethrough extending through the injector block from an injector passage inlet to an injector passage outlet, providing a gas plenum having a plenum wall with an exterior surface and an opening through the plenum wall, and affixing the injector block to the plenum wall with the injector passage inlet in registry with the opening through the plenum wall. At a later time, the injector block may be removed if desired, and a new injector block with a different configuration of the injector passage(s) affixed to the plenum wall. The injector block is conveniently cast with the injector passage defined therein, or the injector passage may be machined into the injector block. Casting of the injector block with one or more integral injector passages allows great flexibility in the selection of the shape, size, and form of the passages.

The present approach provides a gas injector system which is conveniently and inexpensively fabricated. Gas may be injected as required from a plenum, even a thin-walled plenum. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
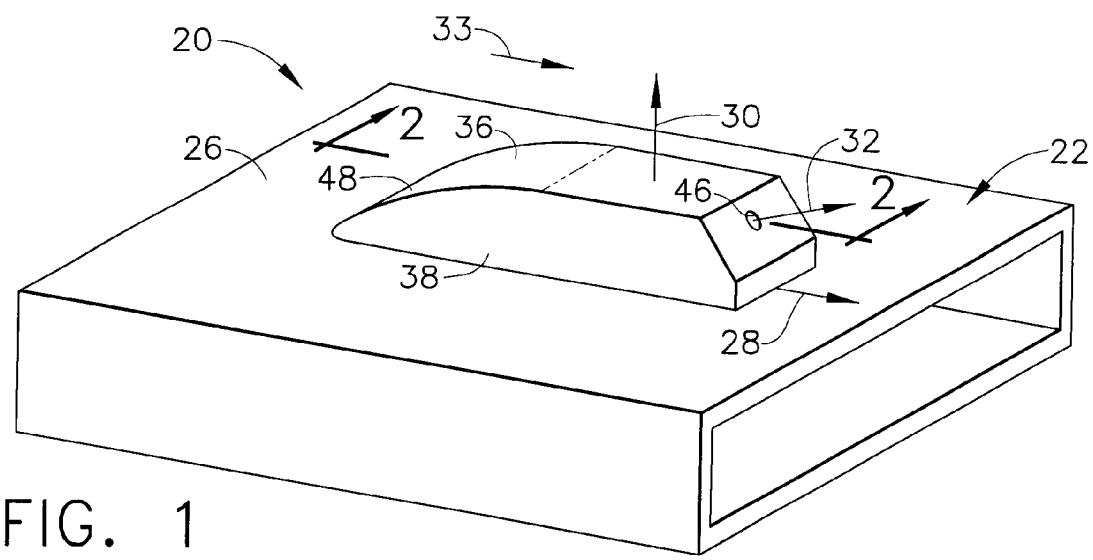
FIG. 1 is a perspective view of a gas injector system.
Figure 2:
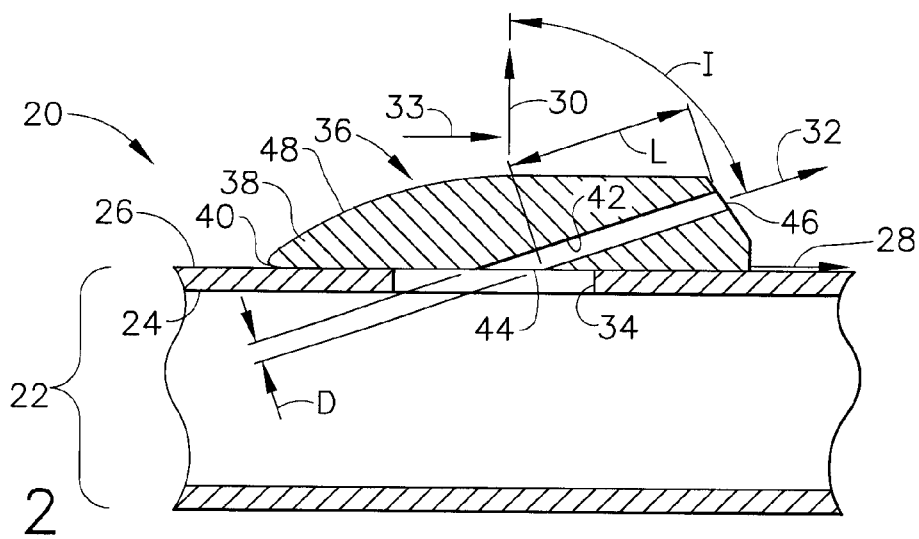
FIG. 2 is a schematic sectional view of the gas injector system of FIG. 1, taken on line 2—2.

FIGS. 1 and 2 depict a gas injector system 20 for injecting gas at an inclined angle. The gas injector system 20 includes a hollow gas plenum 22 having a plenum wall 24 with an exterior surface 26. The plenum wall 24 may have any operable construction, but in a typical case is a relatively thin sheet metal. Gas is supplied from a gas source (not shown) to the plenum 22. The gas injector system 20 may be further described by reference to a local tangential direction 28 that lies parallel to the exterior surface 26, and a local normal direction 30 that lies perpendicular to the exterior surface 26. The local tangential direction 28 is the vector projection onto the exterior surface 26 of an injection vector 32, which is the direction that gas flows from the gas injector system 20. Because the gas injector system 20 may be used in relation to curved exterior surfaces 26, the term "local " is used to refer to these directions 28 and 30 at a specified location on the exterior surface 26. The local tangential direction 28 is preferably parallel to a local gas flow direction 33, where, as is usually the case, there is an ambient gas flow past the injector 36. The plenum 22 has a plenum opening 34 in the plenum wall 24.

The injector 36 is positioned at a location overlying the plenum opening 34. The injector 36 includes an injector block 38 affixed to the plenum wall 24 with a joint 40 between the injector block 38 and the plenum wall 24. The joint 40 is preferably a braze joint when the gas injector system 20 is to operate at high temperatures, or an adhesive joint when the gas injector system 20 is to operate at room temperature or mildly elevated temperature.

An injector passage 42 extends through the interior of the injector block 38 from an injector passage inlet 44 to an injector passage outlet 46. It is preferred that the size and area of the plenum opening 34 be larger than the size and area of the injection passage inlet 44 and the plenum opening 34 during manufacturing operations. The injector block 38 closes and seals the remainder of the plenum opening 34. The injection vector 32 is the direction in which has passes from the injector passage outlet 46. In order to stabilize the flow of gas through the injector passage 42, it is preferred that a ratio L/D of a length L of the injector passage 42 to a diameter D of the injector passage 42 be at least 2/1, and preferably is even greater than 2/1.

The injector passage outlet 46 is oriented at an injection angle I between the local normal direction 30 and the injection vector 32. The injection angle I is more than 0 degrees away from the local normal direction 30 and is inclined toward the local tangential direction 28, such that the injection vector 32 projects normally onto the local tangential direction 28. The injection angle I is preferably from about 50 degrees to about 70 degrees, most preferably about 60 degrees. The injection angle I that is selected is determined by the gas flow requirements in the system that incorporates the gas injector system, and the present approach is suitable for any of a wide range of injection angles I. The injector passage inlet 44 is typically in registry with the plenum opening 34, although that need not be the case.

In service, gas flows from the gas source (not shown), through the plenum 22, through the plenum opening 34, through the injector passage inlet 44 and into the injector passage 42, along the injector passage 42, and out of the injector passage outlet 46 in the direction of the injection vector 32.

In the embodiment of FIGS. 1–2, the injector block 38 projects into the local gas flow as expressed by the local gas flow direction. A leading edge 48 of the injector block 38 may be tapered to reduce the air flow resistance and occurrence of turbulence induced by the injector block 38, as illustrated.

In another embodiment shown in FIG. 3, the injector block 38 is recessed to be flush with the exterior surface 26 (or it could be below the exterior surface 26). In this case, the joint 40 is made to an interior surface 49 of the plenum wall 24. The recessing of the injector block 38 eliminates air flow resistance and turbulence induced by the injector block. Where appropriate in FIG. 3, the same nomenclature and reference numerals are used to indicate elements of structure common with the embodiment of FIGS. 1–2, and the prior description is incorporated here.

Figure 3:
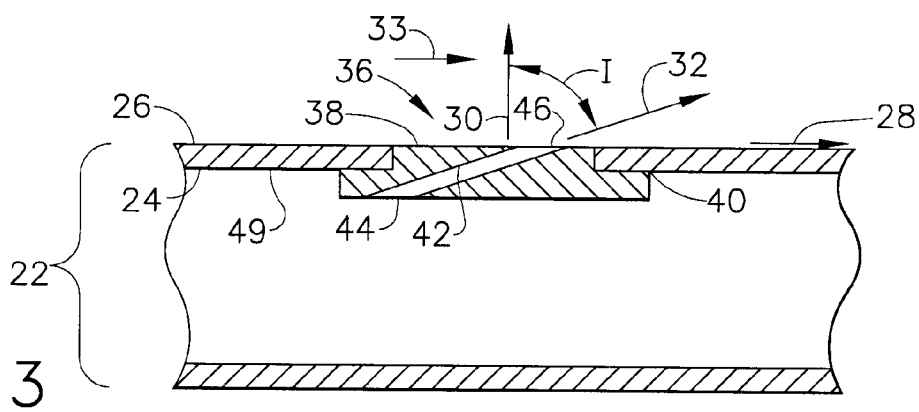
FIG. 3 is a sectional view like that of FIG. 2, showing another embodiment.
Figure 4:
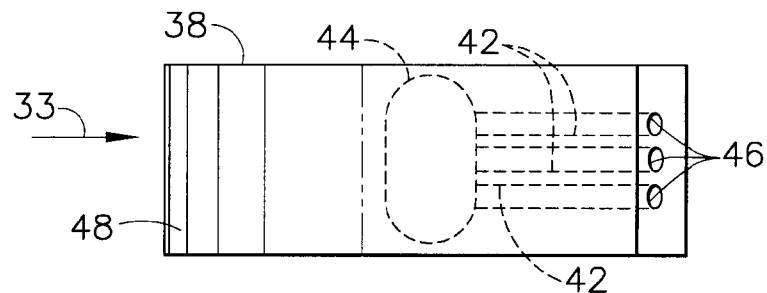
FIGS. 4–6 are plan views of other embodiments of the injector block of the gas injector system, illustrating other configurations of the injector passage.
Figure 5:
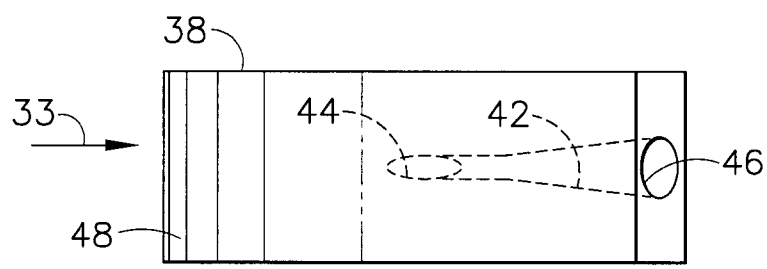
Figure 6:
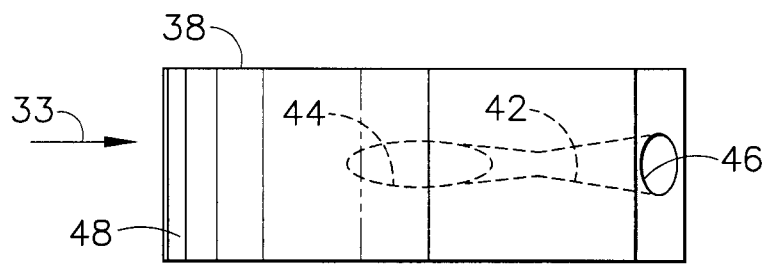

FIGS. 1–3 depict an injector passage 42 which is straight, circular, and of substantially constant diameter and cross-sectional size. The injector passage may be any operable form, and three other operable forms are illustrated in the plan views of FIGS. 4–6, where the internal passage structure is shown in dotted lines. In FIG. 4, there are three injector passages 42 with a common injector passage inlet 44 and three separate injector passage outlets 46 which may or may not be parallel to each other. The injector passages 42 may be circular or non-circular in cross section. In FIG. 5, the injector passage 42 is not of constant cross-sectional diameter and size, and in this case diverges from the injector passage inlet 44 to the injector passage outlet 46 such that the gas flow from the injector passage outlet 46 diverges to form a diverging nozzle. In FIG. 6, the injector passage 42 is not of constant cross-sectional diameter and size, and has a shape that first converges and then diverges from the injector passage inlet 44 to the injector passage outlet 46, so as to form a converging-diverging nozzle. These and other forms of the injector passage 42 may be selected to impart particular flow characteristics to the gas that passes through the injector passage 42.

Figure 7:
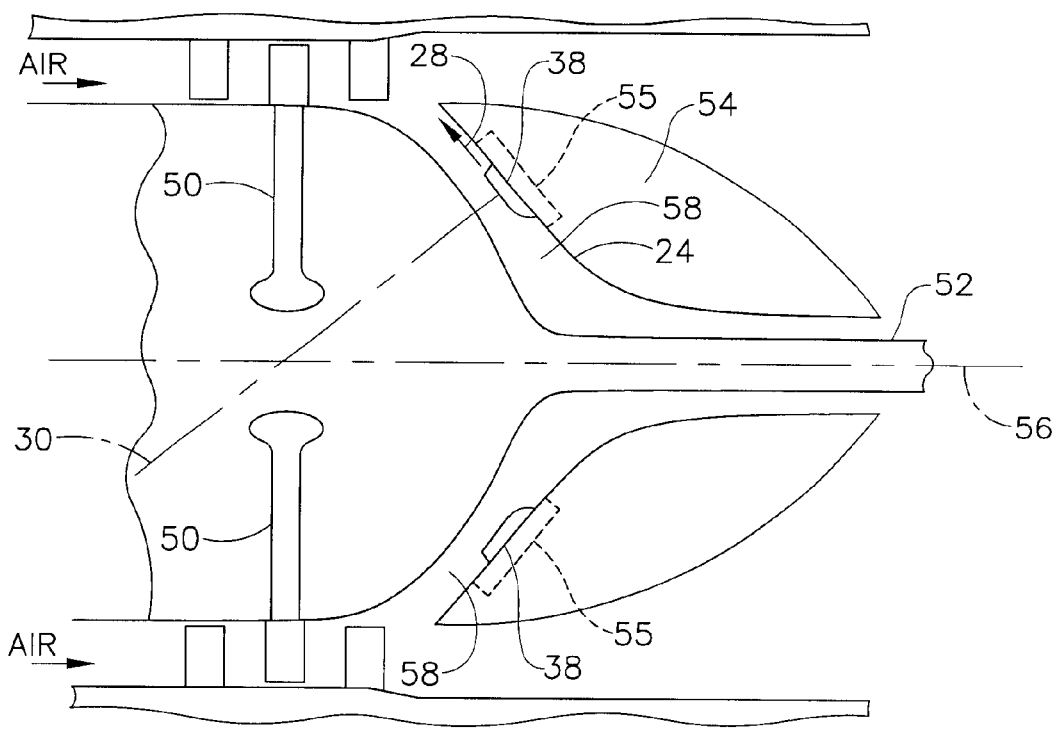
FIG. 7 is a schematic side sectional view of a second embodiment of a gas injector system.

FIG. 7 illustrates an application of the gas injector system in the turbomachinery of a gas turbine engine. Some of the elements are common to the gas injector system discussed earlier. Where appropriate, the same nomenclature and reference numerals are used in the discussion of FIG. 6, and the prior discussion is incorporated here. A compressor disk 50 is supported on a rotating shaft 52. An annular plenum 54 is disposed around a portion of the shaft 52, such that the plenum 54 has an annular centerline 56 that coincides with the axis of rotation of the shaft 52. The local normal direction 30 is perpendicular to the wall 24 of the plenum 54 at the location of the injector block 38. The local tangential direction 28 lies along the surface injector passage 42.

In service, cooling air flows through the plenum 54 and out through the injector block 38 along the injection vector, which is not depicted in FIG. 7 but which projects onto the local tangential direction 28. The injected cooling air enters a cavity 58 between the shaft 52 and the plenum 54 with its major component of momentum parallel to the direction of rotation of the shaft 52. This arrangement avoids undesirable turbulence and windage effects within the cavity 58.

Figure 8:
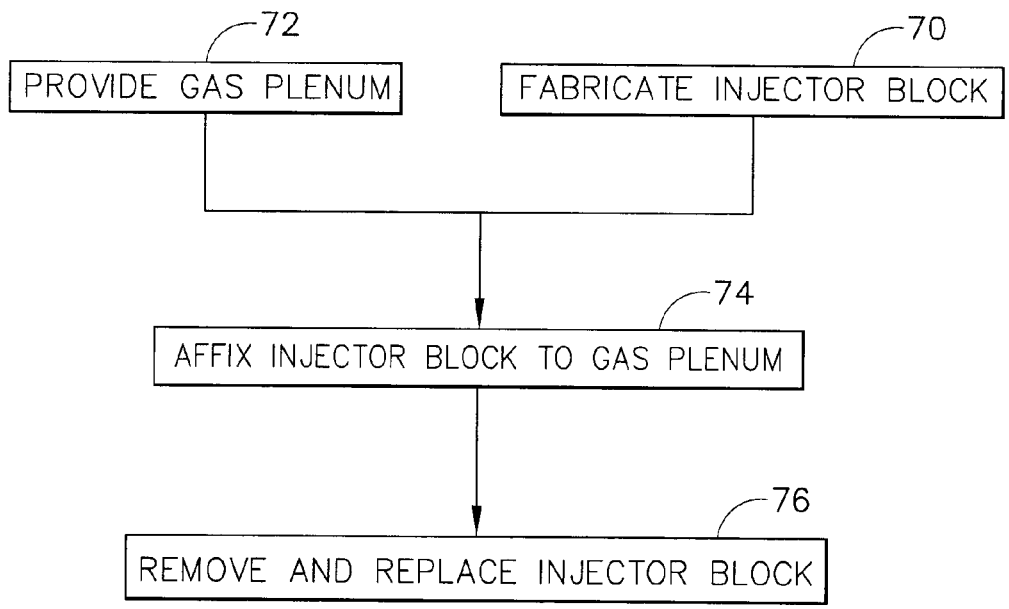
FIG. 8 is a block flow diagram of a preferred approach for practicing the invention.

FIG. 8 depicts a preferred approach for fabricating the gas injector system 20. The injector block 38 is fabricated, numeral 70. The injector block is fabricated by any operable approach. In the preferred approach, the injector block is cast to size and shape, with the injector passage 42 cast in place. To make such a casting, a casting core or quartz rod of the size and shape of the injector passage 42 is positioned in a mold, and molten metal is cast into the mold and solidified. The casting core or quartz rod is removed, leaving the injector block 38 with the cast-in-place injector passage. The injector block 38 may instead be cast, forged, or machined as a solid piece, and the injector passage 42 machined into the injector block 38. The casting-with-core approach is preferred in appropriate cases, because it is of lower cost and also permits the formation of non-cylindrical interior passages such as shown in FIGS. 4–6. The injector block 38 may be made of any material appropriate to the gas injection application. Alloy Inco 718, Rene 77, and A286 are preferred for intermediate-, high-, and low-temperature applications, respectively, but there is no limitation on the type of material that may be used.

The gas plenum (22 or 54) is provided, numeral 72, with the plenum opening(s) 34 machined therethrough at all places where gas injection is required. The locations of the plenum openings 34 are dictated by the gas flow requirements of the system, and establishing these locations is not within the scope of the present invention.

Injector blocks 38 are affixed to the gas plenum (22 or 54) overlying each of the plenum openings 34, numeral 74. As discussed earlier, the plenum openings 34 are preferably made oversize relative to the injector passage inlet 44 of each injector block 38, so as to be tolerant of slight misalignments during the affixing process 74. The injector blocks are affixed by any operable approach. For high-temperature applications such as the gas turbine engine application of FIG. 7, the injector blocks 38 are preferably brazed to the plenum wall 24. Brazing materials and techniques are well known in the art for other applications. Brazing allows the injector block 38 to be affixed to the relatively thin wall of a typical plenum made of sheet metal. Welding and the use of mechanical fasteners may be used instead of brazing. These techniques are far less suitable for affixing the injector blocks 38 to a thin-walled plenum, but they may be the affixing method of choice for other applications.

The gas injector system is complete, and may be placed into service.

An advantage of the present approach is that the injector block 38 may be easily removed by heating the structure to a temperature above the melting point of the brazing metal and lifting the injector block 38 free of the plenum, numeral 76. The removal of one or more of the injector blocks may be required to repair the injector block(s) or to replace the first set of injector blocks with another set of injector blocks having a different pattern or type of the injector passage 42.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A gas injector system, comprising
   a plenum having a plenum wall made of sheet metal and with an exterior surface, a local tangential direction parallel to the exterior surface, and a local normal direction perpendicular to the exterior surface;
   a plenum opening in the plenum wall;
   an injector positioned at a location overlying the plenum opening, the injector comprising
      an injector block affixed to the plenum wall,
      a joint between the injector block and the plenum wall, and
      at least one injector passage extending through the injector block from an injector passage inlet to an injector passage outlet, each injector passage outlet being oriented at an injection angle of more than 0 degrees away from the local normal direction and toward the local tangential direction.

2. The gas injector system of claim 1, wherein the plenum is made of sheet metal.

3. The gas injector system of claim 1, wherein the injector passage is substantially straight.

4. The gas injector system of claim 1, wherein a cross-sectional size of the injector passage is not constant.

5. The gas injector system of claim 1, wherein the injection angle is from about 50 degrees to about 70 degrees.

6. The gas injector system of claim 1, wherein the joint is a brazed joint.

7. The gas injector system of claim 1, wherein the plenum opening is larger in area than the injector passage inlet.

8. The gas injection system of claim 1, wherein the plenum has a plurality of openings in the plenum wall and a respective injector block for each of the openings.

9. The gas injector system of claim 1, wherein the injector block is a cast structure.

10. A gas injector system, comprising
    an annular plenum having an annular centerline, a plenum wall with an exterior surface, a local circumferential tangential direction parallel to the exterior surface, and a local normal direction perpendicular to the exterior surface;
    a plurality of plenum openings in the wall of the annular plenum, the plenum openings being spaced along a circumferential band of the annular plenum;
    a plurality of injectors, each injector being positioned at a location overlying one of the plenum openings, each injector comprising
       an injector block affixed to the plenum wall,
       a joint between the injector block and the plenum wall, and
       at least one injector passage extending through the injector block from an injector passage inlet to an injector passage outlet, each injector passage outlet being oriented at an injection angle of more than 0 degrees away from the local normal direction and toward the local circumferential tangential direction.

11. The gas injector system of claim 10, wherein the annular plenum is made of sheet metal.

12. The gas injector system of claim 10, wherein the injection angle is from about 50 degrees to about 70 degrees.

13. The gas injector system of claim 10, wherein the joint is a brazed joint.

14. The gas injector system of claim 10, wherein the plenum opening is larger in area than the injector passage inlet.

15. The gas injector system of claim 10, wherein a cross-sectional size of the injector passage is not constant.

16. The gas injector system of claim 10, further including a turbomachinery shaft disposed to rotate adjacent to the annular plenum.

17. The gas injector system of claim 10, wherein the circumferential band of the annular plenum faces inwardly toward the annular centerline.

18. A method of fabricating a gas injector system, comprising the steps of:

fabricating an injector block having an injector passage therethrough extending through the injector block from an injector passage inlet to an injector passage outlet;

providing a gas plenum having a plenum wall made of sheet metal with an exterior surface and a plenum opening through the plenum wall; and affixing the injector block to the plenum wall at a location overlying the plenum opening.

19. The method of claim 18, wherein the step of fabricating includes the step of casting the injector block with the injector passage defined therein.

20. The method of claim 18, wherein the step of affixing includes the step of brazing the injector block to the plenum wall.

21. The gas injector system of claim 10, wherein the injector block is a cast structure.

* * * * *